United States Patent
Samuels

(10) Patent No.: US 8,411,832 B2
(45) Date of Patent: Apr. 2, 2013

(54) WIRELESS CALL ROUTING IN A COMMUNICATION PEERING GRID

(75) Inventor: Steven D. Samuels, Denver, CO (US)

(73) Assignee: IntelePeer, Inc., San Mateo, CA (US)

( * ) Notice: Subject to any disclaimer, the term of this patent is extended or adjusted under 35 U.S.C. 154(b) by 69 days.

(21) Appl. No.: 13/233,865

(22) Filed: Sep. 15, 2011

(65) Prior Publication Data

US 2012/0106721 A1    May 3, 2012

Related U.S. Application Data

(60) Provisional application No. 61/408,366, filed on Oct. 29, 2010.

(51) Int. Cl.
*H04M 15/00* (2006.01)
(52) U.S. Cl. ............... 379/121.01; 379/115.01; 455/406
(58) Field of Classification Search .......... 379/111, 379/112.01, 114.01, 115.01, 115.03, 121.01, 379/126, 133, 134; 455/406–409
See application file for complete search history.

(56) References Cited

U.S. PATENT DOCUMENTS

| | | | |
|---|---|---|---|
| 5,758,281 A | 5/1998 | Emery et al. | |
| 6,393,288 B1 * | 5/2002 | Sollee et al. | 455/445 |
| 7,076,038 B1 * | 7/2006 | Pham | 379/114.21 |
| 2002/0193107 A1 * | 12/2002 | Nascimento, Jr. | 455/426 |
| 2003/0086548 A1 * | 5/2003 | Nelson | 379/144.01 |
| 2006/0182234 A1 | 8/2006 | Scherer | |
| 2007/0061397 A1 * | 3/2007 | Gregorat et al. | 709/203 |

FOREIGN PATENT DOCUMENTS

EP    1 777 874    4/2007

* cited by examiner

*Primary Examiner* — Binh Tieu

(74) *Attorney, Agent, or Firm* — DLA Piper LLP (US)

(57) ABSTRACT

A peering grid component operates to facilitate connections of call traffic in a peering grid comprised of customers interconnected with peering partners. A switch is configured to receive call traffic from a customer, and a routing engine is configured to analyze parameters of the call traffic to classify the call traffic as wireless or wire-line traffic. The classification of the call traffic is achieved through the provision of updated wireless routing information accessed by the routing engine. With the classification, the switch, for wireless traffic, accepts and transmits the call traffic at a wireless rate to a peering partner via a connection to the peering partner; and, for wire-line traffic, either transmits the call traffic back to the customer or accepts the call traffic for transmission at a wire-line rate. The wire-line rate is different than the wireless rate, and the associated rates are charged to the customer.

18 Claims, 4 Drawing Sheets

WIRELESS CALL ROUTING IN A COMMUNICATION PEERING GRID

RELATED APPLICATIONS

This application claims priority to U.S. Provisional Application No. 61/408,366, entitled "Wireless Session Initiation Protocol (SIP) Trunk," filed on Oct. 29, 2010, the contents of which are incorporated herein in their entirety.

TECHNICAL FIELD

This application is directed to call traffic in a communication peering grid. More specifically, this application is directed to providing dedicated resources for wireless traffic in a communication peering grid.

BACKGROUND

The use of wireless traffic is continuously growing and will soon, if it is not already, be the majority of all call traffic. With the rapid and widespread growth, resources best utilized for wireless traffic have not been consistently implemented. For example, in a communication peering grid, wireless traffic is subject to the same rates as wire-line traffic, an arrangement that was established at the onset of wireless communication. Due to this arrangement, customers that generate a large amount of wireless traffic are often encumbered with high communication fees and are not compensated for the large amount of wireless traffic that results from their businesses.

Thus, there is a need for providing dedicated resources for wireless traffic to alleviate the current deficiencies with respect to processing and handling wireless traffic.

SUMMARY

A method is provided for routing calls in a peering grid that is comprised of a plurality of customers interconnected with one or more of a plurality of peering partners via a peering infrastructure. The method includes receiving, at the peering infrastructure, call traffic from a customer. Parameters of the call traffic are analyzed to classify the call traffic as wireless or wire-line traffic. If the call traffic is classified as wireless traffic, the call traffic is accepted and transmitted at a wireless rate to a peering partner via a connection to the peering partner, where the call traffic is destined for a phone number registered by the peering partner of the peering grid. If, on the other had, the call traffic is classified as wire-line traffic, an action of (i) transmitting the call traffic back to the customer or (ii) accepting the call traffic and transmitting the call traffic at a wire-line rate is performed. The wire-line rate is different than the wireless rate, and the wireless rate or the wire-line rate is charged to the customer.

A peering infrastructure for routing calls in a peering grid is provided. The peering grid includes a plurality of customers interconnected with one or more of a plurality of peering partners for communicating call traffic. The peering infrastructure includes a switch that is configured to receive call traffic from a customer, and a routing engine that is configured to analyze parameters of the call traffic to classify the call traffic as wireless or wire-line traffic. With the classification of call traffic, the switch is further configured to, for wireless traffic, accept the call traffic and transmit the call traffic at a wireless rate to a peering partner via a connection to the peering partner, the call traffic destined for a phone number registered by the peering partner of the peering grid; and, for wire-line traffic, perform an action of either (i) transmitting the call traffic back to the customer or (ii) accept the call traffic and transmit the call traffic at a wire-line rate. The wire-line rate is different than the wireless rate, and the associated rates are charged to the customer.

BRIEF DESCRIPTION OF THE DRAWINGS

The foregoing summary and the following detailed description are better understood when read in conjunction with the appended drawings. Representative examples are shown in the drawings. However, it is understood that the examples are not limited to the specific methods and instrumentalities depicted herein. In the drawings.

DETAILED DESCRIPTION

Figure 1:
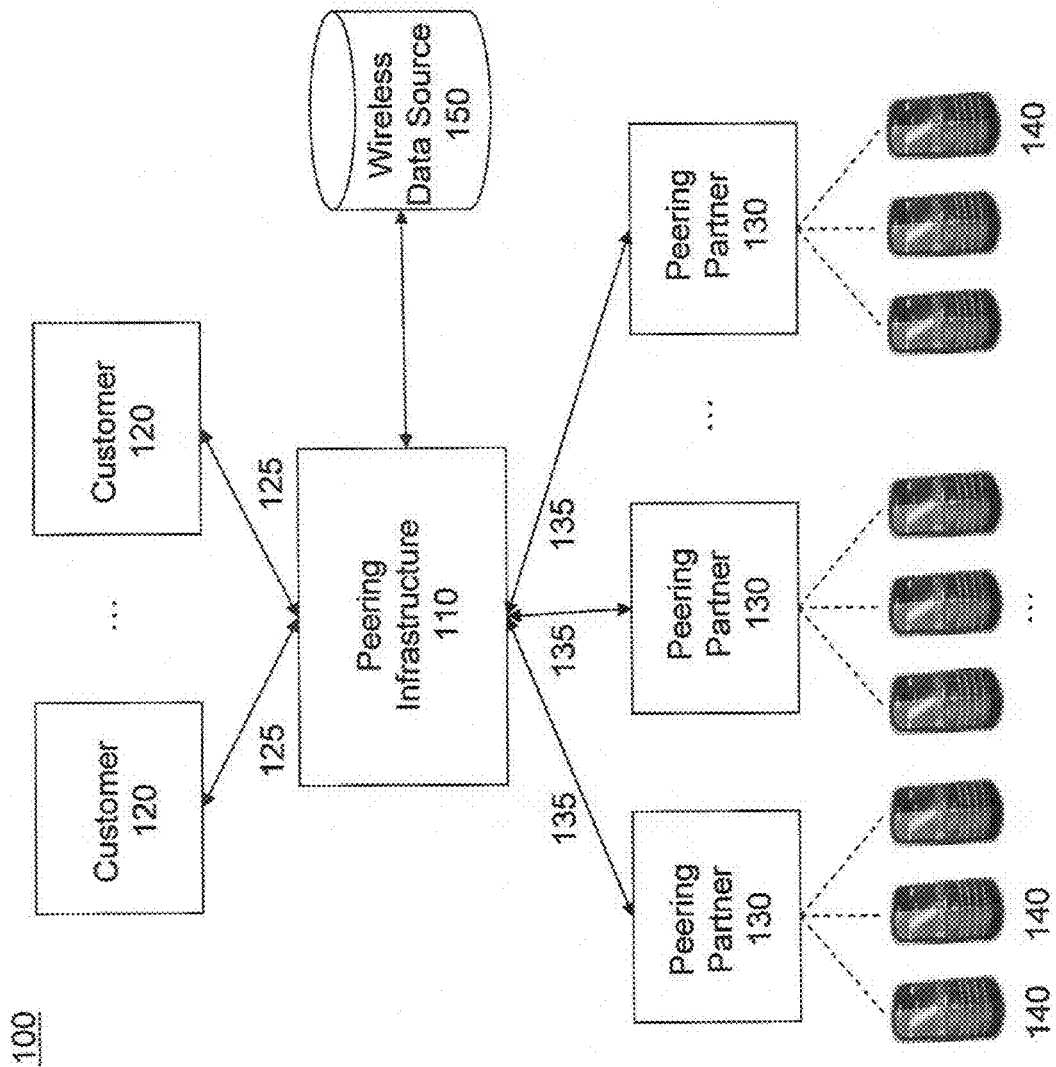
FIG. 1 is a block diagram illustrating a peering grid in which wireless traffic resources are implemented.

A peering grid 100, such as a Media Peering Grid™, is provided, as shown in FIG. 1, to facilitate connections of call traffic between customers 120 and peering partners 130. The customers 120 may include, for example, international telephone service providers, cable companies, local exchange carriers (LECs), and enterprise companies that generate call traffic. The peering partners 130 may be wireless service providers, for example, that provide wireless services to a plurality of wireless-capable communication devices 140. Various other sorts of companies, individuals, networks, and service providers may be a customer 120 or a peering partner 130 in the peering grid 100.

A peering infrastructure 110 is a processing engine that provides the peering partners 130 with direct routing of customer traffic (i.e., communication calls from customers 120) via connections 135 established therebetween. The peering infrastructure 110 operates to provide dedicated resources for wireless traffic.

Call traffic may originate from one or more customers 120 and may be received by the peering infrastructure 110 through Session Initiation Protocol (SIP) lines 125. The connections 135 between the peering infrastructure 110 and the peering partners 130 may be dedicated SIP trunk lines. Alternatively, the connections 135 may be time-division multiplexed (TDM) connections. The connections 135 provide a link to access equipment of the peering partners 130 to enable the peering partners 130 to appropriately handle the call traffic. A peering partner 130 may register with the peering infrastructure 110 to become a registered peering partner to establish the connections 135. In registering with the peering infrastructure 110, a peering partner 130 may provide the peering infrastructure 110 with information related to one or more phone numbers, and one or more network addresses, each network address correlating to one or more of the phone numbers. A peering partner 130, for example, may register telephone numbers with the peering infrastructure 110 along with routing information, such as the internet protocol (IP) address of a peering partner edge routing device or other address which allows access to wireless-capable communication devices 140 assigned to the peering partner 130. Individuals may also register wireless-capable communication devices 140, such as a softphone, with the peering infrastructure 110.

The peering grid 100 also includes a wireless data source 150. Other data sources (not shown) may be part of the peering grid 100 or may be connected to the peering grid 100. The wireless data source 150 is a source that includes and provides to the peering infrastructure 110 data related to wireless numbers and wireless service providers. For example, the wireless data may include wireless telephone numbers (for any type of wireless-capable communication device 140) and corresponding peering partners 130, such as a service provider, that provide wireless services for the wireless-capable communication devices 140. The wireless data may be in the form of wireless routing information including Numbering Plan Area Code Central Office (exchange) Code (NPANXX) numbers, and the wireless data source 150 may be the Local Exchange Routing Guide (LERG). In this example, wireless data may include a NPANXX number and an associated peering partner 130 (service provider).

The wireless data may be provided from the wireless data source 150 to the peering infrastructure 110 on a regularly scheduled basis, such as once every 30 days, for example. Alternatively, the wireless data may be provided at other time periods or upon request or command from the peering infrastructure 110. The LERG, for example, publishes and refreshes wireless data, in the form of a mapping and hierarchy structure, on a monthly basis, which is an industry-accepted standard. The wireless data source 150 may be more than one individual source and may include data from various sources. The wireless data is utilized by the peering infrastructure 110 for call traffic classification and routing decisions, as further described below.

Figure 2:
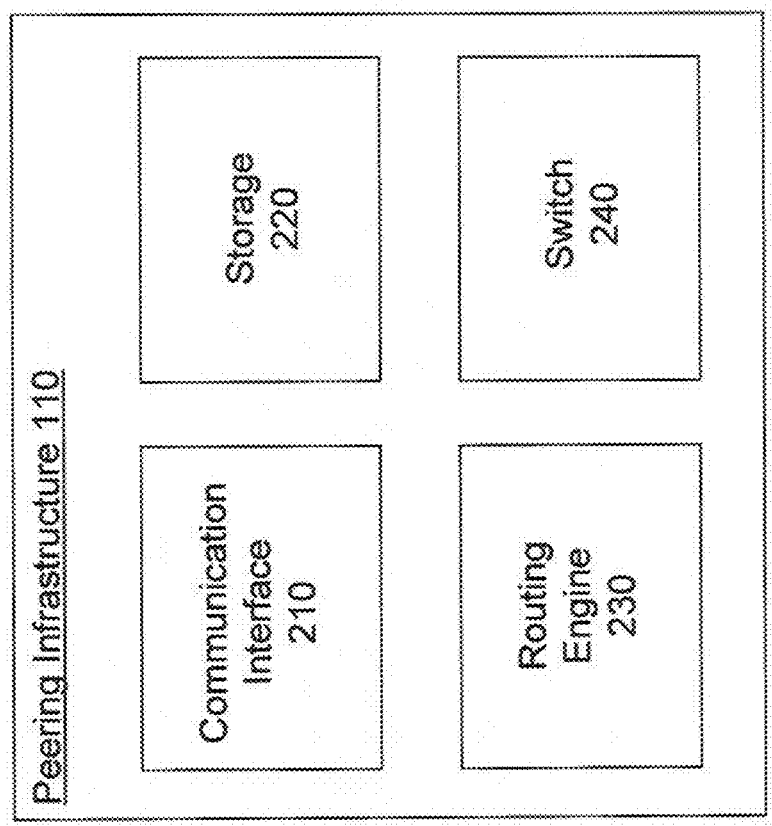
FIG. 2 is a block diagram representing a peering infrastructure.

With reference to FIG. 2, a block diagram of an example architecture of a peering infrastructure 110 is provided. The peering infrastructure 110 may include a communication interface 210, a storage component 220, a routing engine 230, and a switch 240, which together function to provide the peering partners 130 with direct routing of customer call traffic, including dedicated resources for wireless traffic.

One or more of the components 210, 220, 230, and 240 of the peering infrastructure 110 may include one or more components/devices, at least one of which comprises a memory for storing instructions and at least one processor for executing the instructions, where the execution of the instructions causes the components to function as described in further detail below. Such components/devices may include, but are not limited to, servers, personal computers, handheld computing devices, routers, equipment, hardware, and/or other computing devices.

The communication interface 210 provides the functionality for the peering infrastructure 110 to communicate with other nodes or engines, such as the wireless data source 150 and other nodes or engines (not shown). The communication interface 210 may include a SIP (Session Initiation Protocol) interface and/or a SUA (SCCP (Signaling Connection Control Part) User Adaptation Layer) interface for communicating with nodes or engines with SIP or SUA protocols, for example. Other types of interfaces may be incorporated.

The storage component 220 may be a component separate from but accessible by the peering infrastructure 110. Alternatively, the storage component 220 may be an integral component of the peering infrastructure 110. The storage component 220 may be any type of memory component capable of storing information, such as that related to registered peering partners 130, for example, including registered telephone numbers and routing information.

The routing engine 230 is a processing device configured to analyze parameters of the call traffic to classify the call traffic as wireless or wire-line traffic. The classification of call traffic leads to the determination of a routing destination, as described in detail below.

The switch 240 is configured to receive call traffic from a customer 120. The switch 240 is further configured to accept or reject call traffic. In accepting call traffic, the switch 240 transmits the call traffic to a peering partner 130 or to a trunk group or other component. In rejecting the call traffic, the switch 240 transmits the call traffic back to the customer 120.

The routing engine 230 and the switch 240 may be a joint component or may be separate, individual components. The routing engine 230 computes a path for reaching a destination requested within call traffic (i.e., a call offer from a customer 120), and the switch 240 performs the switching maneuver necessary to move the call traffic towards its destination. The switch 240 may be a Softswitch or virtual PBX which is operable to perform various communication tasks over a packet-switched network; such as dialing endpoints, bridging call legs and facilitating Integrated Voice Response (IVR) exchanges. For example, the switch 240 may include logic for translating between a first telecommunications protocol and a second telecommunications protocol.

Figure 3:
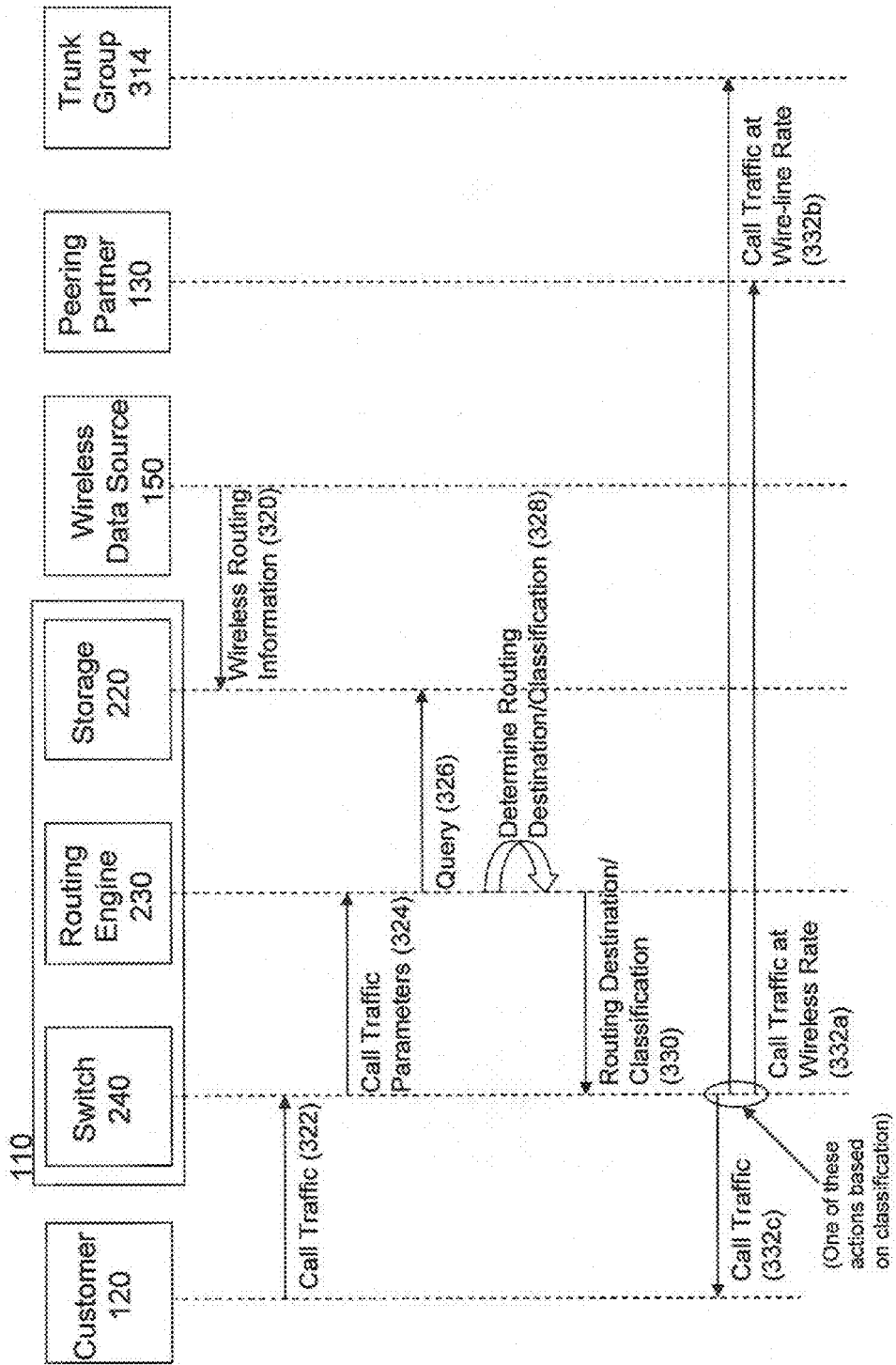
FIG. 3 is a swim-lane diagram illustrating data flow for routing a call in a peering grid.

With reference to FIG. 3, a swim-lane diagram illustrates data flow for routing call traffic in a peering grid, such as the peering grid 100 shown in FIG. 1. Wireless routing information is provided from the wireless data source 150 to the peering infrastructure 110, and in particular to the storage component 220 (320). The wireless routing information may be wireless data related to wireless numbers and wireless service providers. For example, the wireless routing information may include a NPANXX number and an associated peering partner 130 (i.e., a service provider).

At some later time, call traffic is generated from a customer 120 and is transmitted to the peering infrastructure 110; specifically, the switch 240 receives the call traffic (322). The switch 240 communicates call traffic parameters to the routing engine 230 (324). For example, the call traffic may include signaling information that includes a calling number, a called number and a trunk group associated with the called number. Other information (i.e., call traffic parameters) may be included in the signaling information.

The routing engine 230 queries the storage component 220 to determine if the call traffic parameters correspond to any wireless routing information previously provided from the wireless data source 150 (326).

With the call traffic parameters and the results of the query, the routing engine 230 determines a classification for the call traffic, with the classification yielding a routing destination for the call traffic (328). The routing engine 230 may determine a classification for the call traffic through the query by determining if the call traffic parameters correspond to any wireless routing information contained in the storage component 220. If the call traffic matches the wireless routing information, or a subset thereof, the routing engine 230 identifies the call traffic as wireless traffic. If, however, the call traffic does not match any wireless routing information contained in the storage component 220, the routing engine 230 identifies the call traffic as wire-line traffic. The query to the storage component 220 may include searching the stored wireless routing information to determine if a match exists, for example, between a NPANXX number for the received call traffic and a NPANXX number stored in the storage component 220.

With respect to determining the routing destination, if the call traffic is classified as wireless traffic, the routing engine 230 determines, based on the query to the storage component 220, a peering partner 130 that has registered the phone number to which the call traffic is directed. The peering partner 130 may be associated with a destination address or other identifying address or parameters (i.e., the call traffic parameters), such as a NPANXX number. This association information may be part of a registration entry stored in the storage component 220, which may originate from the updated information including wireless routing information provided by the wireless data source 150 to the storage component 220.

If, as another example, the call traffic is wire-line traffic, the routing engine 230 determines if the call traffic should be transmitted back to the customer 120 or transmitted to a trunk group 314 associated with the customer 120. This determination related to wire-line traffic may be based upon pre-established terms with the customer 120 generating the call traffic, where the terms, including routing logic associated with the customer 120 and the destination address of the trunk group 314, are stored in the storage component 220.

Once the routing engine 230 determines a classification and a routing destination for the call traffic, the routing engine 230 provides the classification and/or the routing destination to the switch 240 for appropriate transmission (330). The routing destination may be in the form of a destination address, for example. The switch 240 then accordingly transmits the call traffic at a wireless rate to the corresponding peering partner 130 (332a), at a wire-line rate to a trunk group 314 associated with the customer 120 (332b), or to the customer 120 (332c). The trunk group 314 associated with the customer 120 may be connected to the peering infrastructure 110 through a broadband trunk line. For wireless traffic, the peering partner 130 may be connected to the peering infrastructure 110 through a dedicated Session Initiation Protocol (SIP) trunk line or a time-division multiplexed (TDM) connection, for example.

The wire-line rate or the wireless rate is charged to the customer 120. The wire-line rate may be different than the wireless rate. For example, the wire-line rate may be a higher rate than the wireless rate, thus providing a benefit to customers 120 to route wireless traffic over the peering grid 100. Moreover, the wireless rate may be based on the amount of wireless traffic sent from a customer 120, where more wireless traffic sent results in lower rates, providing an additional incentive for the customer 120 to send wireless traffic over the peering grid 100. Wireless traffic may thus not be subject to the same rates as wire-line traffic.

With respect to charging the customer 120 the appropriate rate for routing call traffic generated by the customer 120, the peering infrastructure 110 may keep track of details related to the call traffic that is successfully routed by the peering infrastructure 110 for billing purposes. The routing engine 230, another dedicated engine (not shown), or an external billing module (not shown), for example, may track the number of minutes or the number of calls of successfully routed call traffic, whether wireless or wire-line, and may send call detail records to each customer 120 at the end of a pre-established billing period or at another defined rate.

Figure 4:
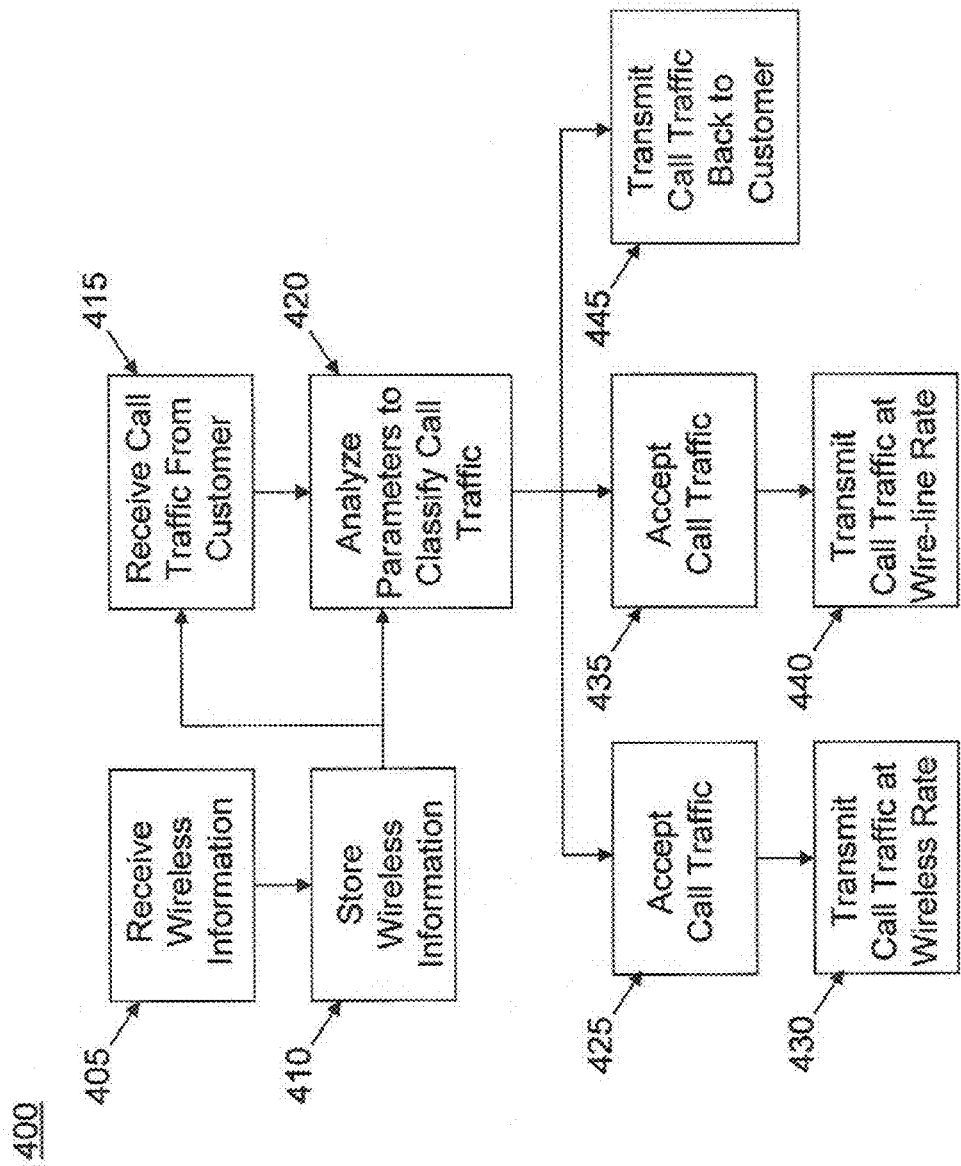
FIG. 4 is a flowchart illustrating a method for routing calls in a peering grid.

FIG. 4 is a flowchart illustrating a method for routing calls in a peering grid, such as the peering grid 100 in which a plurality of customers 120 are interconnected with one or more peering partners 130 via a peering infrastructure 110. The peering partners 130 may be connected to the peering infrastructure 110 via a dedicated SIP trunk line or a TDM connection, while the customers 120 may be connected to the peering infrastructure 110 through SIP connections.

At 405, wireless information is received from, for example, the wireless data source 150. The wireless information may represent updated information related to wireless numbers and wireless service providers. The updated information may include wireless routing information that indicates the peering partners 130 to which the wireless phone numbers are registered. The wireless information may be in the form of registration entries, in which one registration entry corresponds to a NPANXX number and an associated peering partner 130. Other information may be included in a registration entry, such as billing information, user information, customer agreement information, and user preferences, for example.

At 410, the wireless information is stored by the peering infrastructure 110 in, for example, a storage component 220 (i.e., memory) of the peering infrastructure 110. The wireless information may be used in analyzing the parameters of call traffic to classify call traffic as wireless or wire-line traffic.

At 415, call traffic from a customer 120 is received by the peering infrastructure 110. For example, the switch 240 of the peering infrastructure 110 may receive the call traffic and communicate call traffic parameters to the routing engine 230.

At 420 parameters of the call traffic are analyzed by, for example, the routing engine 230, to classify the call traffic as wireless or wire-line traffic. The call traffic may include signaling information including, for example, destination routing information associated with the call traffic. The analysis of the call traffic parameters may include analyzing destination routing information and determining if a match exists between the destination routing information and the updated information related to wireless phone numbers stored in the storage component 220.

The receiving and storing of wireless information, at 405 and 410, respectively, may occur any number of times and at any point prior to either the receipt or the analysis of particular call traffic from a customer, at 415 and 420, respectively. Newly updated wireless information may, for example, be provided on a monthly or other regularly scheduled period as published by the LERG.

The analysis of the call traffic, at 420, results in a classification of the call traffic. The classification indicates if the call traffic is wire-line traffic (i.e., traffic intended for a landline telephone) or wireless traffic (i.e., traffic intended for a wireless device). Such a classification is used to determine routing and rating of the call traffic. For example, if the analysis of the call traffic indicates that a match exists between the destination routing information and the updated information, the call traffic is classified as wireless traffic. If, on the other hand, a match does not exist, the call traffic is classified as wire-line traffic. Alternatively, a match may exist that indicates a destination address of a trunk group 314 associated with the customer 120 that generated the call traffic. As such a match does not indicate a peering partner 130, the call traffic is classified as wire-line traffic.

At 425, for wireless traffic, the call traffic is accepted. At 430, the call traffic is transmitted at a wireless rate to a corresponding peering partner 130, where the call traffic is destined for a phone number registered by the peering partner 130 of the peering grid 100.

If the call traffic is classified as wire-line traffic, different actions may be implemented, depending on, for example, pre-established terms with the customer 120 generating the call traffic. At 435, for wire-line traffic, the call traffic is accepted. The acceptance of the call traffic, and hence the agreement by the peering infrastructure 110 to route the call traffic, may be based on an agreement with the customer 120. At 440, the accepted wire-line call traffic is transmitted at a wire-line rate, which may include transmitting the call traffic via a connection with a trunk group 314 associated with the customer 120 and charging the customer 120 an associated wire-line rate.

As described above, the wire-line rate or/the wireless rate is charged to the customer 120, and the wire-line rate may be different than the wireless rate. For example, the wire-line rate may be a higher rate than the wireless rate, thus providing an incentive to customers 120 to route wireless traffic over the peering grid 100. Moreover, the rates may decrease as the volume of call traffic per customer 120 increases.

At 445, for wire-line traffic from a customer 120 that is not subject to any type of agreement or if certain circumstances for that customer 120 or the call traffic have not been met, the call traffic is transmitted back to the customer 120. At this point, the customer 120 may, if desired, attempt to route the traffic through another grid or by another means.

The peering infrastructure 110, contained in a peering grid 100 of customers 120 and peering partners 130, thus advantageously operates to analyze and determine if received call traffic generated by a customer 120 is wireless call traffic. The peering infrastructure 110 transmits wireless call traffic to peering partners 130 associated with the call traffic at a wireless rate charged to the customer 120. The use of the wireless rate encourages customers 120 to direct their call traffic to the peering infrastructure 110.

The foregoing examples are provided merely for the purpose of explanation and are in no way to be construed as limiting. While reference to the various examples are shown, the words used herein are words of description and illustration, rather than words of limitation. Further, although reference to particular means, materials, and examples are shown, there is no limitation to the particulars disclosed herein. Rather, the examples extend to all functionally equivalent structures, methods, and uses, such as are within the scope of the appended claims.

The invention claimed is:

1. A method for routing calls in a peering grid, the peering grid comprising a plurality of customers interconnected with one or more of a plurality of peering partners via a peering infrastructure, comprising:
    receiving, at the peering infrastructure, call traffic from a customer;
    analyzing parameters of the call traffic to classify the call traffic as wireless or wire-line traffic;
    for wireless traffic, accepting the call traffic and transmitting the call traffic at a wireless rate to a peering partner via a connection to the peering partner, the call traffic destined for a phone number registered by the peering partner of the peering grid;
    for wire-line traffic, performing an action comprising (i) transmitting the call traffic back to the customer or (ii) accepting the call traffic and transmitting the call traffic at a wire-line rate;
    wherein the wire-line rate is different than the wireless rate, and wherein the wireless rate or the wire-line rate is charged to the customer; and
    wherein each of the receiving, analyzing, accepting, and transmitting steps are implemented by a processing device at the peering infrastructure, wherein the processing device accesses instructions from a memory device, the instructions, when executed, causing each of the receiving, analyzing, accepting, and transmitting steps to be implemented.

2. The method of claim 1, wherein performing an action for wire-line traffic is based upon pre-established terms with the customer generating the call traffic.

3. The method of claim 1, wherein the connection to the peering partner comprises a dedicated Session Initiation Protocol (SIP) trunk line or a time-division multiplexed (TDM) connection.

4. The method of claim 1, wherein transmitting the call traffic at a wire-line rate comprises transmitting the call traffic via a connection with a trunk group associated with the customer and charging the customer an associated wire-line rate.

5. The method of claim 1, further comprising:
    receiving updated information related to wireless phone numbers, the updated information comprising wireless routing information, the wireless routing information indicating the peering partners to which the wireless phone numbers are registered.

6. The method of claim 5, wherein analyzing parameters of the call traffic to classify the call traffic as wireless or wire-line traffic comprises:
    analyzing destination routing information associated with the call traffic;
    determining if a match exists between the destination routing information and the updated information related to wireless phone numbers;
    if a match exists, classifying the call traffic as wireless traffic; and
    if a match does not exist, classifying the call traffic as wire-line traffic.

7. The method of claim 6, wherein the call traffic includes signaling information, the signaling information comprising the destination routing information.

8. The method of claim 5, wherein the updated information is provided by a Local Exchange Routing Guide (LERG), and wherein the wireless routing information comprises Numbering Plan Area Code Central Office (exchange) Code (NPANXX) numbers.

9. The method of claim 5, further comprising:
    storing the updated information related to wireless phone numbers, the stored, updated information for use in analyzing the parameters of the call traffic to classify the call traffic as wireless or wire-line traffic.

10. A peering infrastructure for routing calls in a peering grid, the peering grid comprising a plurality of customers interconnected with one or more of a plurality of peering partners for communicating call traffic therebetween, comprising:
    a switch configured to receive call traffic from a customer;
    a routing engine configured to analyze parameters of the call traffic to classify the call traffic as wireless or wire-line traffic;
    the switch further configured to:
        for wireless traffic, accept the call traffic and transmit the call traffic at a wireless rate to a peering partner via a connection to the peering partner, the call traffic destined for a phone number registered by the peering partner of the peering grid;
        for wire-line traffic, perform an action comprising (i) transmit the call traffic back to the customer or (ii) accept the call traffic and transmit the call traffic at a wire-line rate;
    wherein the wire-line rate is different than the wireless rate, and wherein the wireless rate or the wire-line rate is charged to the customer.

11. The peering infrastructure of claim 10, wherein the switch configured to perform an action for wire-line traffic is based upon pre-established terms with the customer generating the call traffic.

12. The peering infrastructure of claim 10, wherein the connection to the peering partner comprises a dedicated Session Initiation Protocol (SIP) trunk line or a time-division multiplexed (TDM) connection.

13. The peering infrastructure of claim 10, wherein the switch configured to transmit the call traffic at a wire-line rate comprises the switch transmitting the call traffic via a connection with a trunk group associated with the customer and charging the customer an associated wire-line rate.

14. The peering infrastructure of claim 10, further comprising:
a communication interface configured to receive updated information related to wireless phone numbers, the updated information comprising wireless routing information, the wireless routing information indicating the peering partners to which the wireless phone numbers are registered.

15. The peering infrastructure of claim 14, wherein the routing engine configured to analyze parameters of the call traffic to classify the call traffic as wireless or wire-line traffic comprises the routing engine:
analyzing destination routing information associated with the call traffic;
determining if a match exists between the destination routing information and the updated information related to wireless phone numbers;
if a match exists, classifying the call traffic as wireless traffic; and
if a match does not exist, classifying the call traffic as wire-line traffic.

16. The peering infrastructure of claim 15, wherein the call traffic includes signaling information, the signaling information comprising the destination routing information.

17. The peering infrastructure of claim 14, wherein the updated information is provided by a Local Exchange Routing Guide (LERG), and wherein the wireless routing information comprises Numbering Plan Area Code Central Office (exchange) Code (NPANXX) numbers.

18. The peering infrastructure of claim 14, further comprising:
storage configured to store the updated information related to wireless phone numbers, the stored, updated information for use in the routing engine analyzing the parameters of the call traffic to classify the call traffic as wireless or wire-line traffic.

* * * * *